(12) United States Patent
Kim

(10) Patent No.: US 11,708,761 B2
(45) Date of Patent: Jul. 25, 2023

(54) MULTI-CYLINDER ROTARY ENGINE HAVING TRIANGULAR CYLINDER

(71) Applicant: Jong Chan Kim, Gimpo-si (KR)

(72) Inventor: Jong Chan Kim, Gimpo-si (KR)

( * ) Notice: Subject to any disclaimer, the term of this patent is extended or adjusted under 35 U.S.C. 154(b) by 0 days.

(21) Appl. No.: 17/908,885

(22) PCT Filed: Feb. 24, 2021

(86) PCT No.: PCT/KR2021/002299
§ 371 (c)(1),
(2) Date: Sep. 1, 2022

(87) PCT Pub. No.: WO2021/177645
PCT Pub. Date: Sep. 10, 2021

(65) Prior Publication Data
US 2023/0090367 A1 Mar. 23, 2023

(30) Foreign Application Priority Data
Mar. 2, 2020 (KR) .......................... 10-2020-0025898

(51) Int. Cl.
*F01D 19/02* (2006.01)
*F02B 53/12* (2006.01)
*F02B 55/02* (2006.01)
*F02B 55/14* (2006.01)
*F02B 55/08* (2006.01)
*F01C 19/02* (2006.01)

(52) U.S. Cl.
CPC .............. *F01C 19/02* (2013.01); *F02B 53/12* (2013.01); *F02B 55/02* (2013.01); *F02B 55/08* (2013.01); *F02B 55/14* (2013.01); *F02B 2730/01* (2013.01)

(58) Field of Classification Search
CPC .......... F01C 19/02; F02B 53/12; F02B 55/02; F02B 55/08; F02B 55/14; F02B 2730/01
See application file for complete search history.

(56) References Cited

U.S. PATENT DOCUMENTS 4,072,447 A * 2/1978 Gaspar .................... F01C 1/077
418/36
2019/0040794 A1 2/2019 Bolduc

FOREIGN PATENT DOCUMENTS

| CN | 102536446 A | 7/2012 |
| JP | 06-047949 B2 | 6/1987 |

(Continued)

*Primary Examiner* — Audrey B. Walter
(74) *Attorney, Agent, or Firm* — Maschoff Brennan

(57) ABSTRACT

An engine includes side plates and inner plates, cylinders installed inside the side plates and the inner plates, having a piston compression chamber, and having an inverted triangular shape and an equilateral triangular shape, an integrated crankshaft rotatably installed to pass through central regions of the inner plates and having crank-eccentric shafts eccentrically formed at both ends thereof, eccentric cams installed in the crank-eccentric shafts as eccentric driving holes and positioned in the piston compression chamber, elliptical rotor pistons rotatably installed on outer peripheral surfaces of the eccentric cams as eccentric cam bearings and eccentrically rotated in opposite directions, and eccentric cam eccentric shafts integrally formed at both ends of the eccentric cams and rotatably connected to an eccentric shaft bearing of a rear eccentric shaft and an eccentric bearing of an output shaft.

5 Claims, 4 Drawing Sheets

(56) References Cited

FOREIGN PATENT DOCUMENTS

| KR | 10-2006-0227891 A | 3/2006 | |
|---|---|---|---|
| KR | 10-1266438 B1 | 8/2012 | |
| WO | WO-2012115379 A2 * | 8/2012 | .............. F02B 53/02 |

* cited by examiner

[FIG. 1]
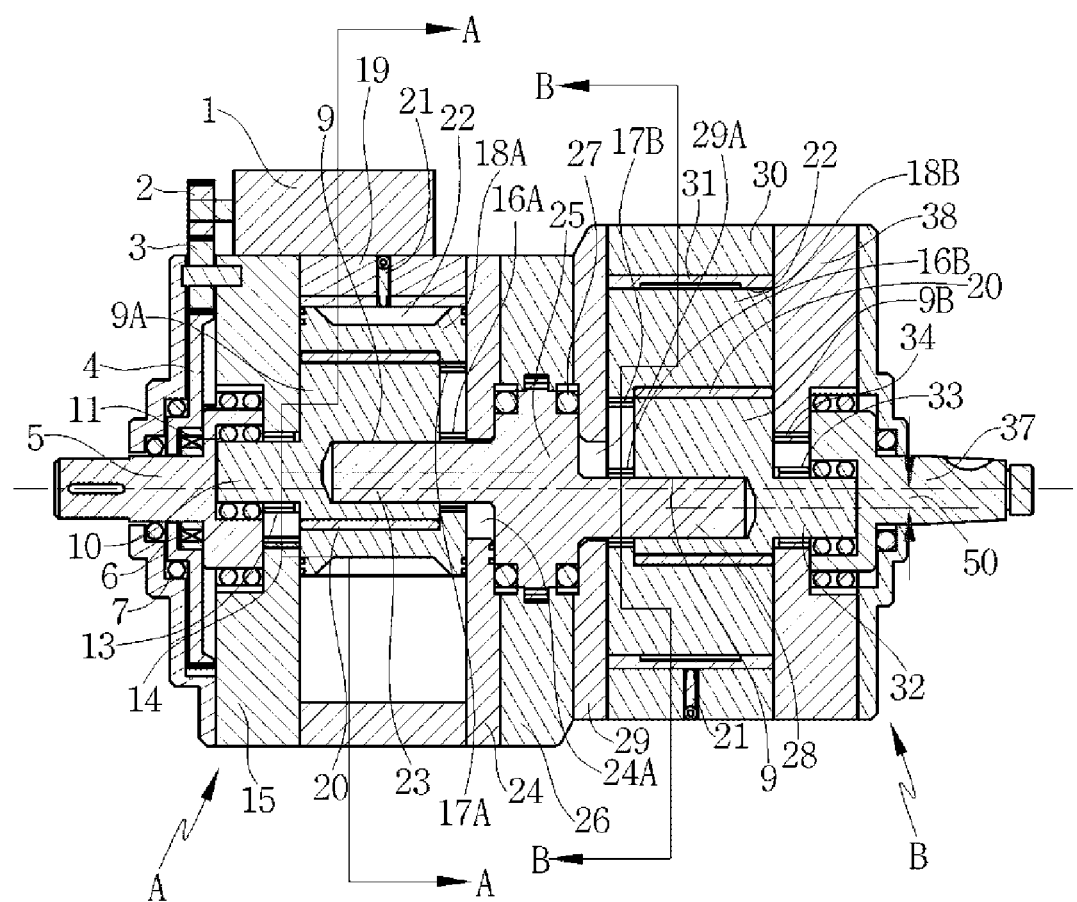

[FIG. 2A]
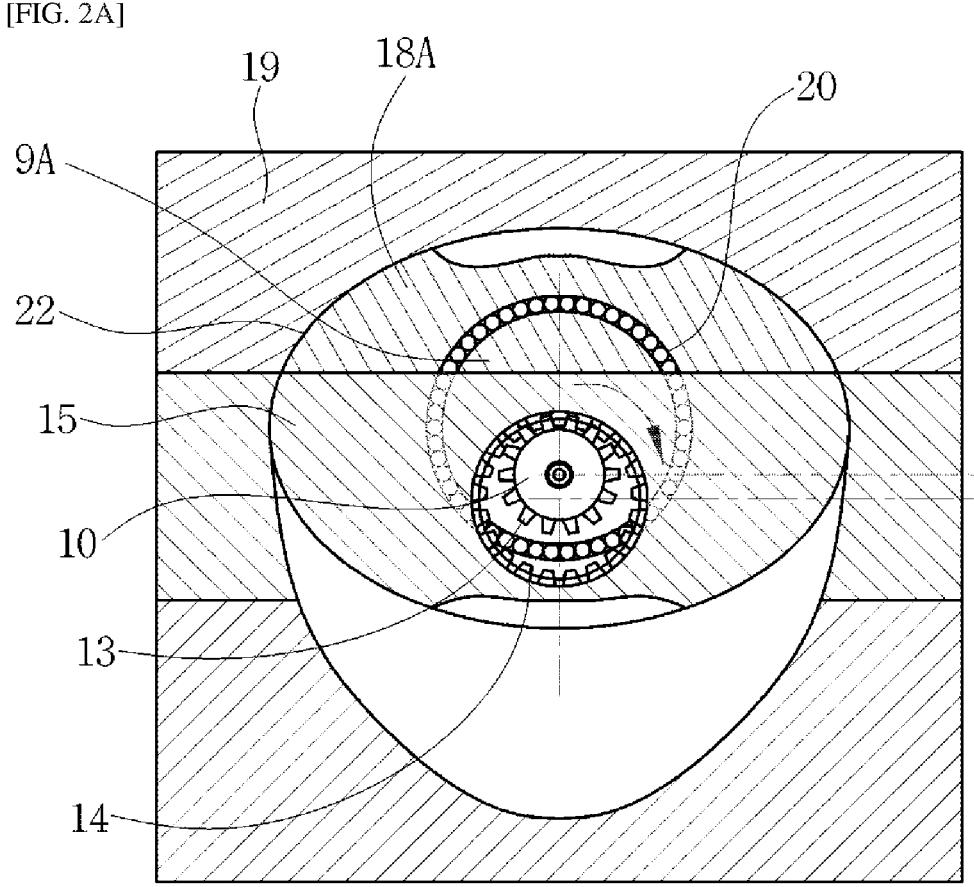

[FIG. 2B]
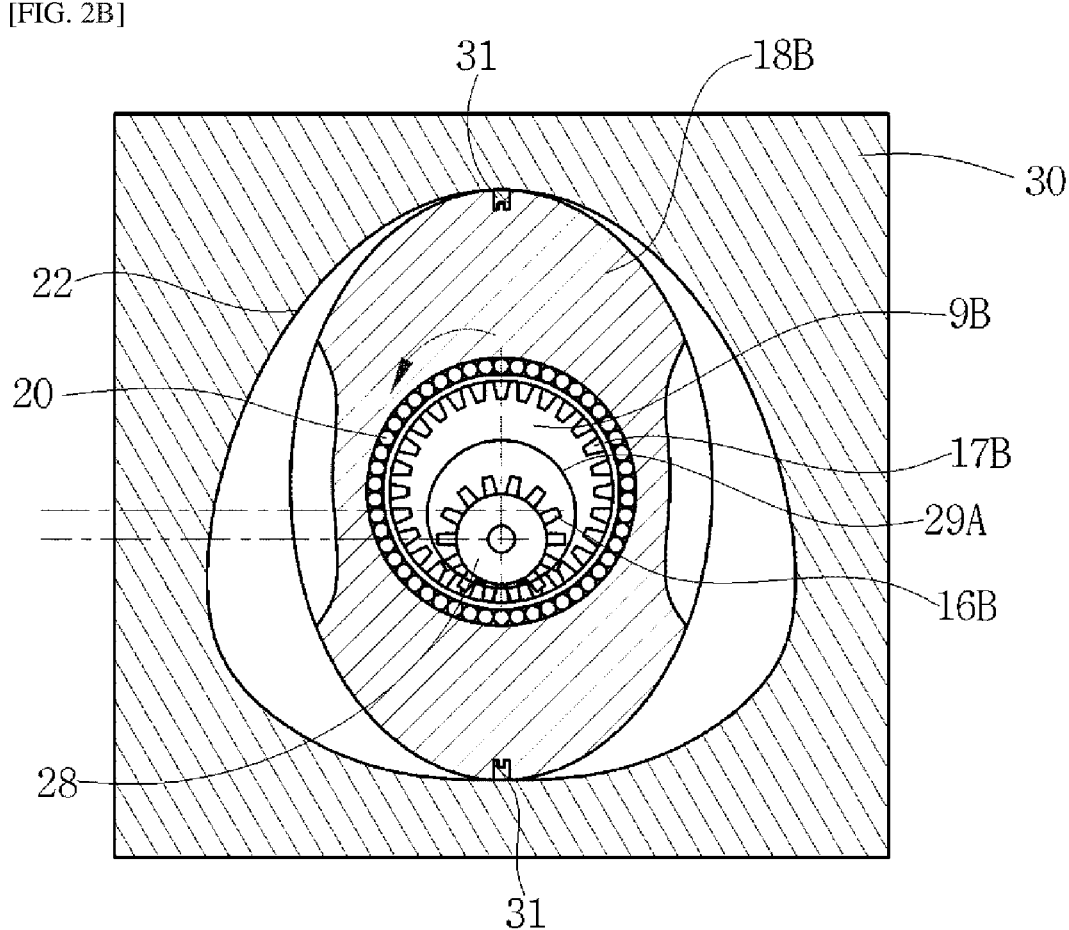

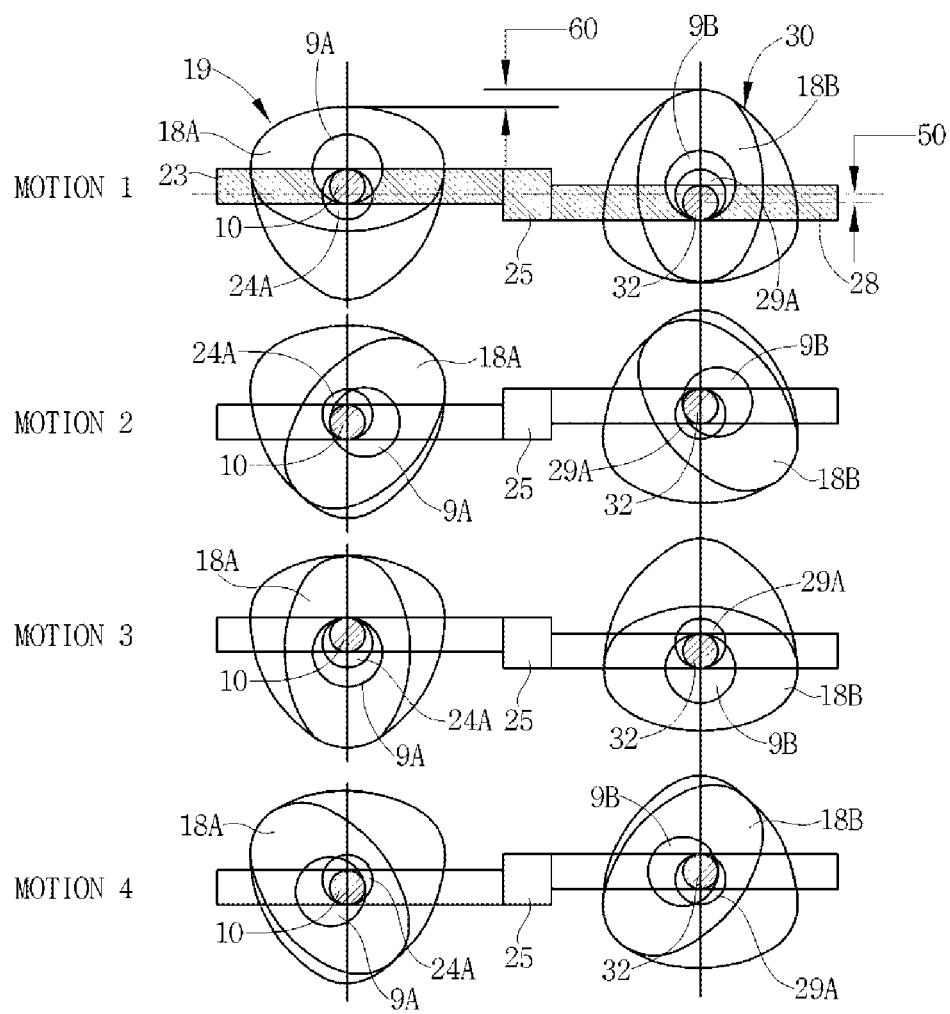

MULTI-CYLINDER ROTARY ENGINE HAVING TRIANGULAR CYLINDER

TECHNICAL FIELD

The present invention relates to a multi-cylinder rotary engine having a triangular cylinder, and more particularly, to a multi-cylinder internal combustion engine for realizing miniaturization of a rotary engine including a triangular cylinder and an elliptical rotor piston.

BACKGROUND ART

In general, rotary engines use the same principle as reciprocating piston engines for obtaining rotational power by performing four strokes but has a motion structure for inducing the four strokes, which obtains rotational power as a rotor serving as a piston rotates eccentrically in a cylinder unlike an engine for converting a linear reciprocating motion of a piston into a rotational motion of a crankshaft. Further, the rotary engines have a structure that performs the four strokes without an intake/exhaust valve by a camshaft, and thus have great advantages in terms of the noise and energy efficiency of the engine as compared to piston-type reciprocating engines.

Thus, the rotary engines are also being manufactured as a multi-cylinder engine like the piston reciprocating engine. However, the rotary engines according to the related art are configured as multi-cylinder engines having a shape in which a cylinder has a circular shape or an elliptical shape and a rotational radius of a rotor piston is sufficiently secured within the cylinder, and like a reciprocating piston engine, the multi-cylinder engines are easily manufactured by simply increasing the number of eccentric cams and the number of cylinders on a crank center shaft.

However, when the cylinder of the rotary engine has a triangular shape and the rotor piston has an elliptical shape, there is a problem in securing the rotational radius of the rotor piston in the cylinder. Therefore, even in a single-cylinder engine having this shape, this structure in which the rotor piston should be unavoidably driven in a double-rotation reverse rotation trajectory is difficult, and in the engine market in which multiple cylinders are indispensable, when a separate parallel shaft or a number of connection gear parts are additionally used as a component only for implementing the multiple cylinders as in the related art, the economic feasibility is reduced and the miniaturization is degraded.

Korean Patent Registration No. 10-1266438 (Title of the Invention: Gear type connection device which transfers rotation power of rotor of rotary engine to output shaft) is provided as the related art of the rotary engine. In this case, a separate parallel shaft in addition to a central drive shaft (a crankshaft) is used to integrate and output power generated inside two cylinders, ten or more gear parts are additionally required to connect the parallel shaft, and the volume is increased due to the increased parts.

In the problem that occurs in the related art, the structure of the crankshaft is not an integrated type but has three separate parts, the rigidity is very low, and a minute power transmission time difference thus occurs between a rotor on a cylinder side directly connected to a start motor among a plurality of two cylinders and a rotor on an output shaft cylinder side received through a separate connection transmission shaft when the engine is initially started up with the start motor. This indicates that it is clear that trouble (occurrence of accidents) increases as a usage time increases.

Further, in the related art, since a target engine corresponds to 4 cycles, an output shaft should rotate twice when a rotor piston is combusted one time. Therefore, in order to satisfy this condition, an excessive number of gears and parallel shafts are used, and thus accumulated gear tolerance is large. Moreover, in the rotary engine having more than twice the number of rotations of the reciprocating piston engine, generation of noise and heat is further increased, and thus a higher level of durability is required.

DISCLOSURE

Technical Problem

An aspect of the present invention is to solve a problem that, since the number of components increases due to a complex principle structure of the related art, a volume increases, the structure is uneconomical, and durability is low.

Another aspect of the present invention is to position a plurality of cylinders in opposite directions (a difference of 180 degrees) on one crankshaft which is shortened as much as possible without increasing the volume or the number components of an engine, to accurately drive an integrated crankshaft and a plurality of rotor pistons by predetermined eccentricity amounts (operation strokes) from different starting points, and thereby to achieve miniaturization and simplicity.

Technical Solution

In a solution of the present invention, first, not a parallel crankshaft using two shafts but a single integrated crankshaft is installed in a central portion between two cylinders, power generated by the two cylinders is transferred to an eccentric inner diameter (HOLE) of an eccentric ring positioned inside a rotor through an eccentric shaft on a crank shaft, and an eccentric rotational force is transferred to an eccentric bearing on a rear portion of an output shaft through the eccentric shaft of the eccentric ring again.

This is a structure in which power generated by the plurality of cylinders is concisely transferred to a final output shaft in a direct connection method using various stages of eccentric rotational forces, and this structure utilizes the eccentric driving principle.

Further, the integrated crankshaft is firmly fixed by two bearings on both sides of the shaft, but is also connected to an eccentric cam, and thus is mutually supported.

Second, as a solution of an output problem of transferring a rotational power generated by the plurality of cylinders to an output shaft, a parallel output device, which has been a problem in the related art, is modified into an efficient serial output device.

To solve this problem, the plurality of cylinders are installed at different positions by 180 degrees in a rotational linear direction, and a rotational center height between the two tiers is adjusted according to an eccentric stroke of the integrated crankshaft.

Such changes are illustrated in FIGS. 1 to 3, and as described above, one elliptical piston among elliptical pistons that are connected from a single crankshaft as a starting point and eccentrically rotate is always in a horizontal state and the other one thereof is always in a vertical state in a multi-cylinder engine even when the elliptical pistons in a triangular cylinder smoothly perform a four-stroke operation by applying reverse rotational devices of the eccentric cam, operation trajectories of the two cylinders are not symmetrical to each other when the cylinders are installed in the same direction (combustion positions are the same), and thus an eccentric rotation radius of the crankshaft and two rotor pistons cannot be assembled.

In this way, the only solution for accurately driving the rotor pistons, which cannot be combined in position when the engine is operated with a single crankshaft, is to make operation positions of the two cylinders different from each other by 180 degrees.

That is, a smooth operation state of a multi-cylinder, which is a technology of the present invention is illustrated in a drawing by a principle diagram of FIG. 3, and further, this drawing expresses a state in which an idea is applied as described above.

Thus, position of ignition plug of each cylinder is different, and compression, combustion, explosion, and stroke are merely performed at opposite positions within the cylinders.

In this case, the integrated crankshaft in which an eccentric shaft and a pinion gear are integrated is firmly installed in the center between the two cylinders with support of both hearings, and as the plurality of rotor pistons also formed at opposite positions by 180 degrees in the integrated crankshaft are connected in precise symmetry with the integrated crankshaft and are eccentrically driven, each of the rotor pistons is driven by normal four cycles (when the rotor is combusted once, the output shaft is rotated twice) along specific forward and reverse eccentric trajectories with a ½ rotation (half rotation) combustion time difference.

Advantageous Effects

The present invention is applied only to a multi-cylinder rotary engine only having a triangular cylinder and an elliptical rotor piston among rotary engines having various structures.

Thus, the multi-cylinder engine according to the related art inevitably has a parallel-type structure, but a series type of the present invention is applied, and thus a crankshaft part is changed to an integrated crankshaft instead of a weak and complicated assembly type so that a rotation error problem during operation is solved and durability is improved.

Further, in the series structure, as the number of components such as parallel shafts and gears is greatly reduced, the size of the engine is also reduced, and thus economic efficiency is improved, noise and a failure rate are lowered, and the extension of a lifetime and the miniaturization of the engine are ultimately achieved. Further, although ignition explosion positions of each of the cylinders are different, deformation on one side (ignition, combustion, explosion, opposite position), which is one of the problems of the rotary engine, is reduced, thereby contributing to the extension of the lifetime of the engine.

DESCRIPTION OF DRAWINGS

FIG. 1 is an assembly view of a multi-cylinder rotary engine having a triangular cylinder according to the present invention.

FIGS. 2A and 2B are detailed cross-sectional views illustrating an installation direction of two cylinders in the multi-cylinder rotary engine having a triangular cylinder according to the present invention.

FIG. 3 is a principle diagram of a multi-cylinder-type four-cycle operation of the multi-cylinder rotary engine having a triangular cylinder according to the present invention.

BEST MODE

As the best mode of the present invention, an engine includes side plates 15 and 38 and inner plates 24 and 29, cylinders 19 and 30 installed inside the side plates 15 and 38 and the inner plates 24 and 29, having a piston compression chamber 22, and having an inverted triangular shape and an equilateral triangular shape, an integrated crankshaft 25 rotatably installed to pass through central regions of the inner plates 24 and 29 and having crank-eccentric shafts 23 and 28 eccentrically formed at both ends thereof, eccentric cams 9A and 9B installed in the crank-eccentric shafts 23 and 28 as eccentric driving holes 9 and positioned in the piston compression chamber 22, elliptical rotor pistons 18A and 18B rotatably installed on outer peripheral surfaces of the eccentric cams 9A and 9B as eccentric cam bearings 20 and eccentrically rotated in opposite directions, and eccentric cam eccentric shafts 10 and 32 integrally formed at both ends of the eccentric cams 9A and 9B and rotatably connected to an eccentric shaft bearing 11 of a rear eccentric shaft 5 and an eccentric bearing 35 of an output shaft 37.

In the engine, the rear eccentric shaft 5 is rotated by engaging a motor shaft gear 2, a secondary connection gear 3, and a tertiary connection gear 4 when driving a starter motor 1 installed in the cylinder 19, the integrated crankshaft 25 and the crank-eccentric shafts 23 and 28 are rotated simultaneously while the eccentric cam eccentric shaft 10 of the eccentric cam 9A is driven, and the eccentric cam 9B and the eccentric cam eccentric shaft 32 connected by an eccentric stroke 50 of the crank-eccentric shafts 23 and 28 rotate the output shaft 37 centrifugally.

MODES OF THE INVENTION

Hereinafter, embodiments of the present invention will be described in detail with reference to the accompanying drawings.

In the accompanying drawings, FIG. 1 is an assembly view of a multi-cylinder rotary engine having a triangular cylinder according to the present invention, FIGS. 2A and 2B are detailed cross-sectional views illustrating an installation direction of two cylinders in the multi-cylinder rotary engine having a triangular cylinder according to the present invention, and FIG. 3 is a principle diagram of a multi-cylinder-type four-cycle operation of the multi-cylinder rotary engine having a triangular cylinder according to the present invention.

As illustrated in FIGS. 1 to 3, the multi-cylinder rotary engine having a triangular cylinder according to the present invention has a structure in which rotational power generated by rotor pistons 18A and 18 is transferred to one output shaft 37, an integrated crankshaft 25 eccentric on both sides is applied to centers of cylinders 19 and 30 to which an ignition plug 21 is coupled, and a plurality of cylinders A and B are positioned on both sides of the integrated crankshaft 25 in a reverse direction (a half rotation position) by 180 degrees and connected to crank-eccentric shafts 23 and 2S integrally formed on both side surfaces of the integrated crankshaft 25.

Eccentric cams 9A and 9B inside the rotor pistons 18A and 18B and eccentric cam eccentric shafts 10 and 32 integrally formed on both sides of the eccentric cams 9A and 9B extend together with eccentric shaft pinion gears 13 and 33, and the eccentric cam eccentric shafts 10 and 32 are connected to a rear eccentric shaft 5 and an output shaft 37.

As detailed additional contents, as in FIGS. 1 and 2, the plurality of cylinders A and B are positioned in a straight reverse direction by 180 degrees, and the integrated crankshaft 25 is rotatably installed as a crankshaft bearing 27 on an inner peripheral surface of a crankshaft bearing plate 26 positioned between inner plates 24 and 29 on both sides of a centrifugally rotating section is firmly supported.

In this case, the crank-eccentric shafts 23 and 28 formed at both ends of the integrated crankshaft 25 pass through side rotation holes 24A an 29B formed to correspond to the inner plates 24 and 29, are connected to eccentric driving holes 9 of the eccentric cams 9A and 9B combined in central portions of the rotor pistons 18A and 18B, and are mutually supported, the eccentric cams 9A and 9B are driven equally eccentrically by an eccentric stroke 50 of the crank-eccentric shafts 23 and 28, and thus the rear eccentric shaft 5 and the output shaft 37 rotate.

The eccentric cams 9A and 9B are formed on sides opposite to the eccentric driving holes 9 coaxially with the crank-eccentric shafts 23 and 28 and are integrated with the eccentric shaft pinion gears 13 and 33.

Since the centers of the eccentric cam eccentric shafts 10 and 32 of the eccentric cams 9A and 9B exactly coincide with the crank-eccentric shafts 23 and 28, the output shaft 37 is rotationally driven by the same eccentric stroke 50 from a central region of the integrated crankshaft 25.

The eccentric cam eccentric shafts 10 and 32 are connected to eccentric shaft bearings 11 and 35 inside the rear eccentric shaft 5 and the output shaft 37.

The role of the eccentric shaft pinion gears 13 and 33 is to perform essential functions of operating in connection with fixed internal gears 14 and 34 fixed to inner peripheral surfaces of side plates 15 and 38, rotating the eccentric cants 9A and 9B themselves in a direction opposite to the rotor pistons 18A and 18B in a state in which the rotational directions of the eccentric shaft pinion gears 13 and 33 when the rotor pistons 18A and 18B rotate are the same as those of the rotor pistons 18A and 18B, and smoothly driving the rotor pistons 18A and 18B formed in an elliptic shape inside the inverted triangular cylinder 19 and the equilateral triangular cylinder 30.

The engine according to the present invention as configured in this way includes the side plates 15 and 38 and the inner plates 24 and 29, the cylinders 19 and 30 installed inside the side plates 15 and 38 and the inner plates 24 and 29, having a piston compression chamber 22, and having an inverted triangular shape and an equilateral triangular shape, the integrated crankshaft 25 rotatably installed to pass through central regions of the inner plates 24 and 29 and having the crank-eccentric shafts 23 and 28 eccentrically formed at both ends thereof, the eccentric cams 9A and 9B installed in the crank-eccentric shafts 23 and 28 as the eccentric driving holes 9 and positioned in the piston compression chamber 22, the elliptical rotor pistons 18A and 18B rotatably installed on outer peripheral surfaces of the eccentric cams 9A and 9B as eccentric cam bearings 20 and eccentrically rotated in opposite directions, and the eccentric cam eccentric shafts 10 and 32 integrally formed at both ends of the eccentric cams 9A and 9B and rotatably connected to the eccentric shaft bearing 11 of the rear eccentric shaft 5 and the eccentric bearing 35 of the output shaft 37.

The rear eccentric shaft 5 is rotated by engaging a motor shaft gear 2, a secondary connection gear 3, and a tertiary connection gear 4 when driving a starter motor 1 installed in the cylinder 19, the integrated crankshaft 25 and the crank-eccentric shafts 23 and 2S are rotated simultaneously while the eccentric cam eccentric shaft 10 of the eccentric cam 9A is driven, and the eccentric cam 9B and the eccentric cam eccentric shaft 32 connected by the eccentric stroke 50 of the crank-eccentric shafts 23 and 28 rotate the output shaft 37 centrifugally.

The eccentric cam eccentric shafts 10 and 32 are integrally formed with the eccentric shaft pinion gears 13 and 33 and are engaged with the fixed internal gears 14 and 34 to be operated in connection therewith so that the eccentric cams 9A and 9B are reversely rotated. The integrated crankshaft 25 is integrally formed with crankshaft pinion gears 16A and 16B, is inscribed with internal piston gears 17A and 17B, and comes into contact with the piston compression chamber 22 along a trajectory in which the elliptical rotor pistons 18A and 18B alternately rotate on the basis of surface points of piston seals 31 at both ends in a longitudinal direction. Thus, the rotor pistons 18A and 18B are smoothly driven.

In this case, ignition positions of the cylinders 19 and 30 installed in both directions based on the integrated crankshaft 25 are configured in reverse directions, a difference between the ignition positions of the cylinders 19 and 30 corresponds to 180 degrees (half rotations a vertical rotational direction, there is a difference 60 between the heights of the cylinders 19 and 30 with the integrated crankshaft 25 as a central axis, and the height difference between the cylinders 19 and 30 is adjusted according to the sizes of the cylinders 19 and 30 and the eccentric stroke 50 of the integrated crankshaft 25.

Further, in the cylinders 19 and 30 installed in the reverse direction, to drive the rotor pistons 18A and 18B as the integrated crankshaft 25 using the same eccentric stroke 50, the rotor pistons 18A and 18B should be symmetrical in operation.

An operation state of the present invention configured as above will be schematically described.

As illustrated in FIGS. 1 to 3, the starter motor 1 is driven, the motor shaft gear 2, the secondary connection gear 3, and the tertiary connection gear 4 connected to the starter motor 1 are rotated, and the rear eccentric shaft 5 is simultaneously rotated by the tertiary connection gear 4 that rotates while supported by a tertiary gear bearing 7.

In this case, a rear shaft bearing 6 that may specially rotate only in one direction is installed between the tertiary connection gear 4 and the rear eccentric shaft 5 and has a structure in which a special shape is applied to a portion in which a bearing ball is positioned unlike a general bearing and thus the rear shaft bearing 6 rotates in only one direction.

In addition, the tertiary connection gear 4 is rotated by the starter motor 1 so that the rear eccentric shaft 5 rotates together. However, in contrast, when the engine is rotationally driven normally by combustion and thus the rear eccentric shaft 5 first rotates, a restraining force of the rear shaft bearing 6 with the tertiary connection gear 4 is released, and no rotational force is transmitted to the tertiary connection gear 4.

The reason why the rear shaft bearing 6 is applied is to lower cost of the starter motor 1 and increase a lifetime that is relatively short.

Next, when the rear eccentric shaft 5 rotates, the eccentric cam eccentric shafts 10 and 32 on the eccentric cams 9A and 9B connected to the inner eccentric shaft bearings 11 and 35 are eccentrically driven.

At the same time, the eccentric cam 9A is reversely rotated by the fixed internal gears 14 and 34, the crankshaft pinion gears 16A and 16B integrated with the integrated crankshaft 25 are inscribed with the internal piston gears 17A and 17B fixed to inner peripheral surfaces of the rotor pistons 18A and 18B and come into contact with inner surfaces of the cylinders 19 and 30 along a specific trajectory (when the elliptical rotor piston rotates, the elliptical rotor piston does not rotate with a piston as a central starting point but alternately rotates about the surface points of the seals 31 at both ends in the longitudinal direction one by one), and thus the rotor pistons 18A and 18B are smoothly driven.

Next, when compressed fuel is combusted and exploded, power is generated, and thus the rotor pistons 18A and 18B are driven by their own power, as described above, the tertiary connection gear 4 is automatically stopped, and thus like a general vehicle structure, the motor shaft gear 2 of the starter motor 1 does not need to move rearward.

Next to the operation sequence, the biggest problem in a process of inventing the multi-cylinder engine is that no matter how excellent the triangular cylinder engine is in terms of an output, when the engine is complicated and large in size, the multi-cylinder engine cannot be competitive.

As a result, in the present invention, by reversing the combustion positions of the plurality of cylinders, a symmetric trajectory is made in the operation of the rotor piston, the principle of eccentricity is applied to the maximum, and thus the problem is solved.

Currently, in rotary engines having triangular cylinders around the world, a serial type of the multi-cylinders is not present, and a parallel type thereof has been registered but is not well received.

The invention claimed is:

1. A multi-cylinder rotary engine comprising:
   side plates (15)(38) and inner plates (24)(29);
   cylinders (19)(30) installed inside the side plates (15)(38) and the inner plates (24)(29), having a piston compression chamber (22), and having an inverted triangular shape and an equilateral triangular shape;
   an integrated crankshaft (25) rotatably installed to pass through central regions of the inner plates (24)(29) and having crank-eccentric shafts (23)(28) eccentrically formed at both ends thereof;
   eccentric cams (9A)(9B) installed in the crank-eccentric shafts (23)(28) as eccentric driving holes (9) and positioned in the piston compression chamber (22);
   elliptical rotor pistons (18A)(18B) rotatably installed on outer peripheral surfaces of the eccentric cams (9A)(9B) as eccentric cam bearings (20) and eccentrically rotated in opposite directions; and
   eccentric cam eccentric shafts (10)(32) integrally formed at both ends of the eccentric cams (9A)(9B) and rotatably connected to an eccentric shaft bearing (11) of a rear eccentric shaft (5) and an eccentric bearing (35) of an output shaft (37),
   wherein the rear eccentric shaft (5) is rotated by engaging a motor shaft gear (2), a secondary connection gear (3), and a tertiary connection gear (4) when driving a starter motor (1) installed in the cylinder (19), the integrated crankshaft (25) and the crank-eccentric shafts (23)(28) are rotated simultaneously while the eccentric cam eccentric shaft (10) of the eccentric cam (9A) is driven, and the eccentric cam (9B) and the eccentric cam eccentric shaft (32) connected by an eccentric stroke (50) of the crank-eccentric shafts (23)(28) rotate the output shaft (37) centrifugally.

2. The multi-cylinder rotary engine of claim 1, wherein the eccentric cam eccentric shafts (10)(32) are integrally formed with eccentric shaft pinion gears (13)(33) and are engaged with fixed internal gears (14)(34) to be operated in connection therewith so that the eccentric cams (9A)(9B) are reversely rotated, the integrated crankshaft (25) is integrally formed with crankshaft pinion gears (16A)(16B), is inscribed with internal piston gears (17A)(17B), and comes into contact with the piston compression chamber (22) along a trajectory in which the elliptical rotor pistons (18A)(18B) alternately rotate based on surface points of piston seals (31) at both ends in a longitudinal direction, and thus, the rotor pistons (18A)(18B) are smoothly driven.

3. The multi-cylinder rotary engine of claim 1, wherein the integrated crankshaft (25) is rotatably installed as a crankshaft bearing (27) on an inner peripheral surface of a crankshaft bearing plate (26) positioned between the inner plates (24)(29).

4. The multi-cylinder rotary engine of claim 1, wherein ignition positions of the cylinders (19)(30) installed in both directions based on the integrated crankshaft (25) are configured in reverse directions, a difference between the ignition positions of the cylinders (19)(30) corresponds to 180 degrees (half rotation) in a vertical rotational direction, there is a difference (60) between the heights of the cylinders (19)(30) with the integrated crankshaft (25) as a central axis, and the height difference between the cylinders (19)(30) is adjusted according to the sizes of the cylinders (19)(30) and the eccentric stroke (50) of the integrated crankshaft (25).

5. The multi-cylinder rotary engine of claim 4, wherein in the cylinders (19)(30) installed in the reverse direction, to drive the rotor pistons (18A)(18B) as the integrated crankshaft (25) using the same eccentric stroke (50), the rotor pistons (18A)(18B) are symmetrical in operation.

* * * * *